USO05584495A

United States Patent [19]

Mason

[11] Patent Number: 5,584,495
[45] Date of Patent: Dec. 17, 1996

[54] TRAILER HITCH LOCKING ASSEMBLY

[76] Inventor: Eric Mason, 1917 Charade Way, Redding, Calif. 96002

[21] Appl. No.: 456,478

[22] Filed: Jun. 1, 1995

[51] Int. Cl.⁶ .................................................. B60D 1/60
[52] U.S. Cl. ................................................... 280/507
[58] Field of Search .................................. 280/504, 506, 280/507, 511

[56] References Cited

U.S. PATENT DOCUMENTS

| | | | |
|---|---|---|---|
| 3,884,055 | 5/1975 | Vuillemot | 280/507 X |
| 4,208,065 | 6/1980 | Hansen | 280/507 |
| 4,459,832 | 7/1984 | Avrea et al. | 280/507 X |
| 4,577,884 | 3/1986 | Harris | 280/507 |
| 4,836,570 | 6/1989 | Lopez et al. | 280/507 |
| 5,087,064 | 2/1992 | Guhlin | 280/507 |
| 5,433,468 | 7/1995 | Dixon | 280/507 |
| 5,476,281 | 12/1995 | Worthington | 280/507 |

*Primary Examiner*—Kevin Hurley

[57] ABSTRACT

An assembly for locking a trailer hitch to a trailer ball. The inventive device includes a mounting plate securable between a hitch ball and a vehicle hitch. A trailer tongue securing assembly is pivotally mounted to the mounting plate and can be pivoted over the hitch ball to capture a trailer tongue therebetween. A ball securing assembly is pivotally mounted to the mounting plate and can be positioned over a mounting shank of the ball to preclude removal of the ball. A lock assembly extends between the ball securing assembly and the trailer tongue securing assembly to preclude unauthorized or unintentional decoupling of the hitch.

16 Claims, 3 Drawing Sheets

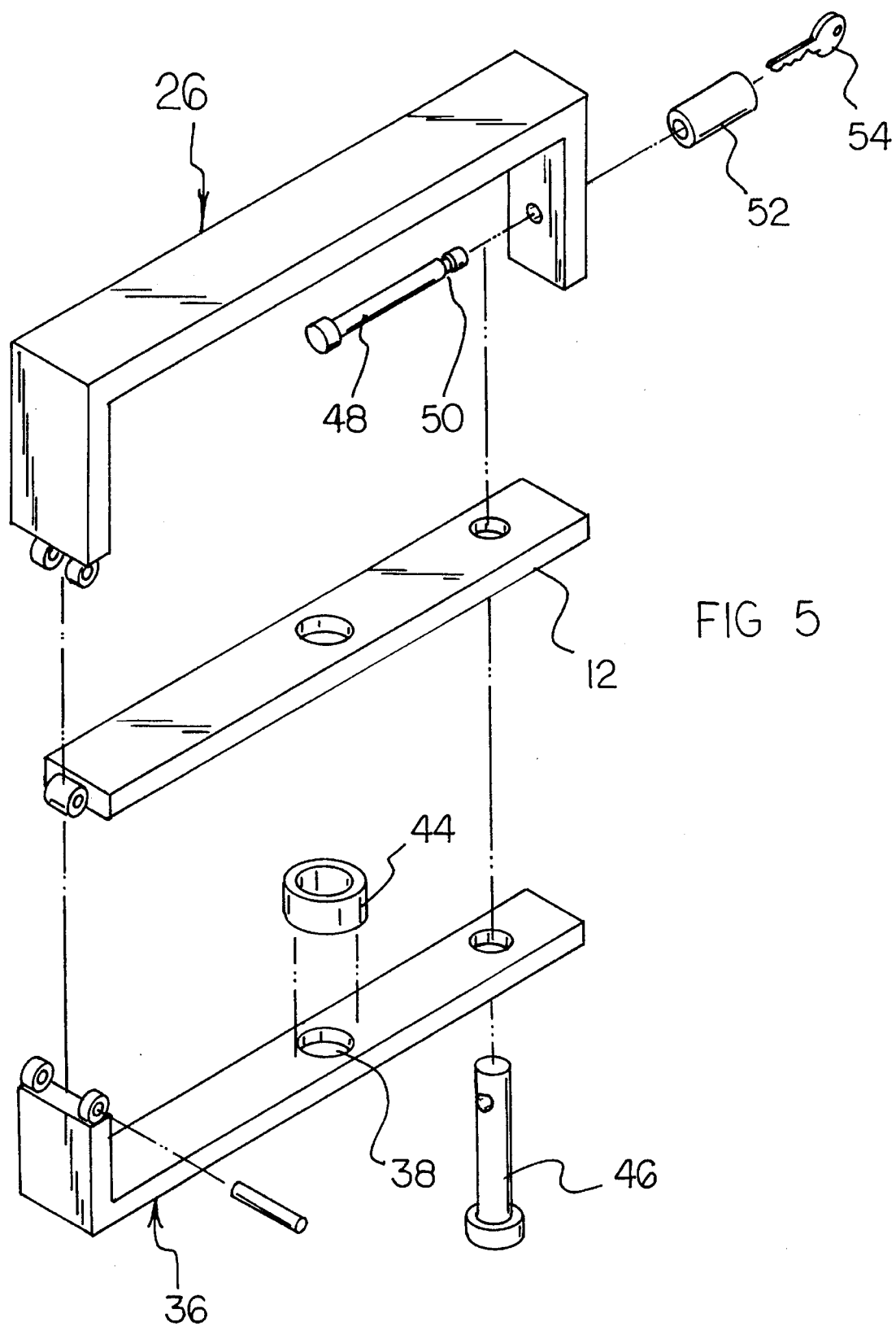

form the subject matter of the claims appended hereto.

TRAILER HITCH LOCKING ASSEMBLY

BACKGROUND OF THE INVENTION

1. Field of the Invention

The present invention relates to locking devices and more particularly pertains to a trailer hitch locking assembly for locking a trailer hitch to a trailer ball.

2. Description of the Prior Art

The use of locking devices is known in the prior art. More specifically, locking devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art locking devices include U.S. Pat. No. 4,852,902; U.S. Pat. No. 5,018,759; U.S. Pat. No. 4,082,311; U.S. Pat. No. 4,509,770; U.S. Pat. No. 4,629,207; and U.S. Pat. No. 5,078,418.

While these devices fulfill their respective, particular objectives and requirements, the aforementioned patents do not disclose a trailer hitch locking assembly for locking a trailer hitch to a trailer ball which includes a mounting plate securable between a hitch ball and a vehicle hitch, a trailer tongue securing means pivotally mounted to the mounting plate for positioning over the hitch ball to capture a trailer tongue therebetween, a ball securing means pivotally mounted to the mounting plate for positioning over a mounting shank of the ball to preclude removal of the ball, and a lock means extending between the ball securing means and the trailer tongue securing means to preclude unauthorized or unintentional decoupling of the hitch.

In these respects, the trailer hitch locking assembly according to the present invention substantially departs from the conventional concepts and designs of the prior art, and in so doing provides an apparatus primarily developed for the purpose of locking a trailer hitch to a trailer ball.

SUMMARY OF THE INVENTION

In view of the foregoing disadvantages inherent in the known types of locking devices now present in the prior art, the present invention provides a new trailer hitch locking assembly construction wherein the same can be utilized for locking a trailer hitch to a trailer ball. As such, the general purpose of the present invention, which will be described subsequently in greater detail, is to provide a new trailer hitch locking assembly apparatus and method which has many of the advantages of the locking devices mentioned heretofore and many novel features that result in a trailer hitch locking assembly which is not anticipated, rendered obvious, suggested, or even implied by any of the prior art locking devices, either alone or in any combination thereof.

To attain this, the present invention generally comprises an assembly for locking a trailer hitch to a trailer ball. The inventive device includes a mounting plate securable between a hitch ball and a vehicle hitch. A trailer tongue securing assembly is pivotally mounted to the mounting plate and can be pivoted over the hitch ball to capture a trailer tongue therebetween. A ball securing assembly is pivotally mounted to the mounting plate and can be positioned over a mounting shank of the ball to preclude removal of the ball. A lock assembly extends between the ball securing assembly and the trailer tongue securing assembly to preclude unauthorized or unintentional decoupling of the hitch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer hitch locking assembly apparatus and method which has many of the advantages of the locking devices mentioned heretofore and many novel features that result in a trailer hitch locking assembly which is not anticipated, rendered obvious, suggested, or even implied by any of the prior art tool guides, either alone or in any combination thereof.

It is another object of the present invention to provide a new trailer hitch locking assembly which may be easily and efficiently manufactured and marketed.

It is a further object of the present invention to provide a new trailer hitch locking assembly which is of a durable and reliable construction.

An even further object of the present invention is to provide a new trailer hitch locking assembly which is susceptible of a low cost of manufacture with regard to both materials and labor, and which accordingly is then susceptible of low prices of sale to the consuming public, thereby making such trailer hitch locking assemblies economically available to the buying public.

Still yet another object of the present invention is to provide a new trailer hitch locking assembly which provides in the apparatuses and methods of the prior art some of the advantages thereof, while simultaneously overcoming some of the disadvantages normally associated therewith.

Still another object of the present invention is to provide a new trailer hitch locking assembly for locking a trailer hitch to a trailer ball.

Yet another object of the present invention is to provide a new trailer hitch locking assembly which includes a mounting plate securable between a hitch ball and a vehicle hitch, a trailer tongue securing means pivotally mounted to the mounting plate for positioning over the hitch ball to capture a trailer tongue therebetween, a ball securing means pivotally mounted to the mounting plate for positioning over a mounting shank of the ball to preclude removal of the ball, and a lock means extending between the ball securing means and the trailer tongue securing means to preclude unauthorized or unintentional decoupling of the hitch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an exploded isometric illustration of the present invention.

DESCRIPTION OF THE PREFERRED EMBODIMENT

Figure 1:
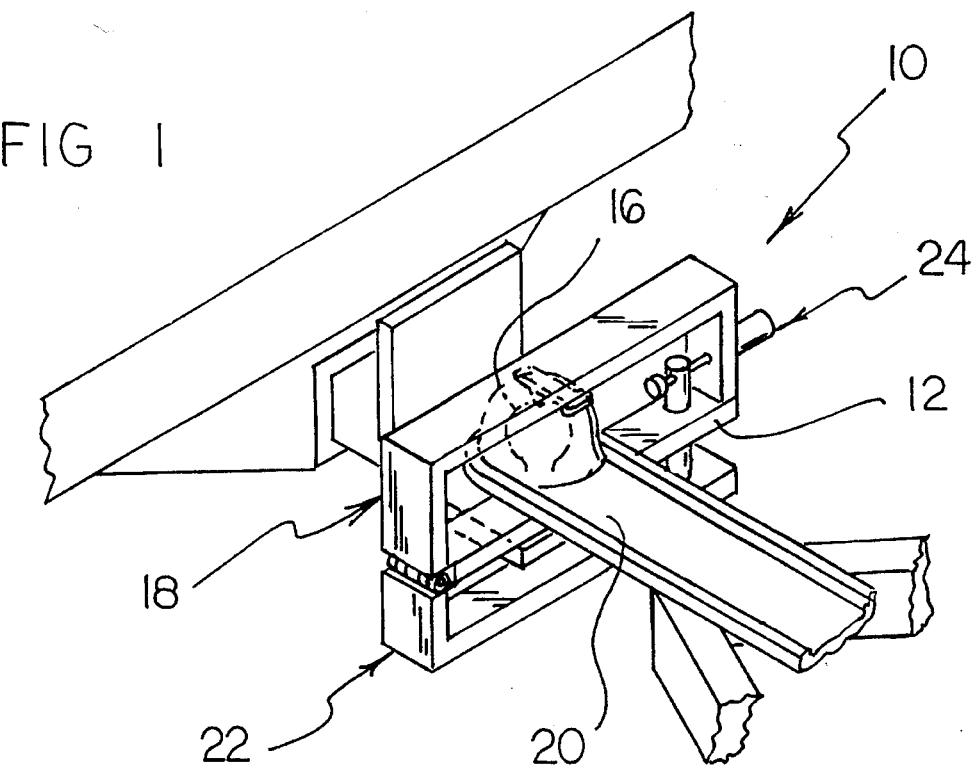
FIG. 1 is an isometric illustration of a trailer hitch locking assembly according to the present invention in use.

With reference now to the drawings, and in particular to FIGS. 1–5 thereof, a new trailer hitch locking assembly embodying the principles and concepts of the present invention and generally designated by the reference numeral 10 will be described.

Figure 3:
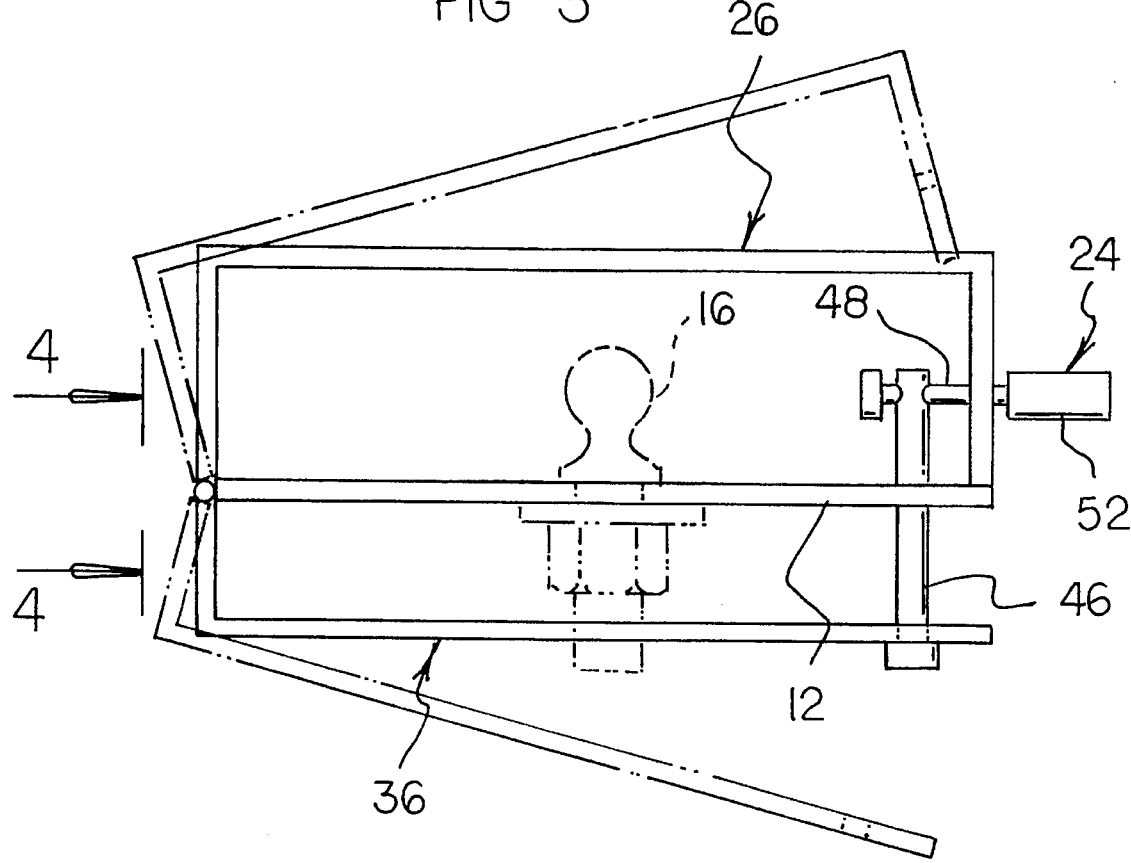
FIG. 3 is a front elevation view thereof.
Figure 4:
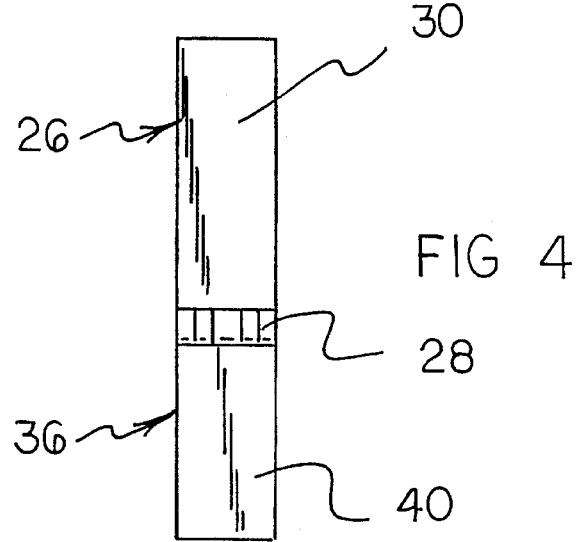
FIG. 4 is a side elevation view of the invention.

More specifically, it will be noted that the trailer hitch locking assembly 10 comprises a mounting plate 12 having a mounting aperture 14 directed therethrough permitting positioning and securement of the mounting plate between a hitch ball 16 and an unlabelled vehicle hitch. A trailer tongue securing means 18 is pivotally mounted to the mounting plate 12 and can be positioned over the hitch ball 16 so as to capture a tongue 20 of a trailer between the trailer tongue securing means and the hitch ball. A ball securing means 22 is pivotally mounted to the mounting plate 12 and can be positioned over an unlabelled mounting shank of the hitch ball 16, as shown in FIG. 3, so as to preclude unauthorized removal of the hitch ball from the vehicle hitch. A lock means 24 extends between the ball securing means 22 and the trailer tongue securing means 18 for securing the ball securing means 22 relative to the trailer tongue securing means 18 as shown in FIG. 1 of the drawings. By this structure, unauthorized or unintentional removal of a tongue 20 of a trailer from a ball hitch 16 of a vehicle hitch and/or removal of the hitch ball 16 from the vehicle hitch is substantially precluded.

Figure 2:
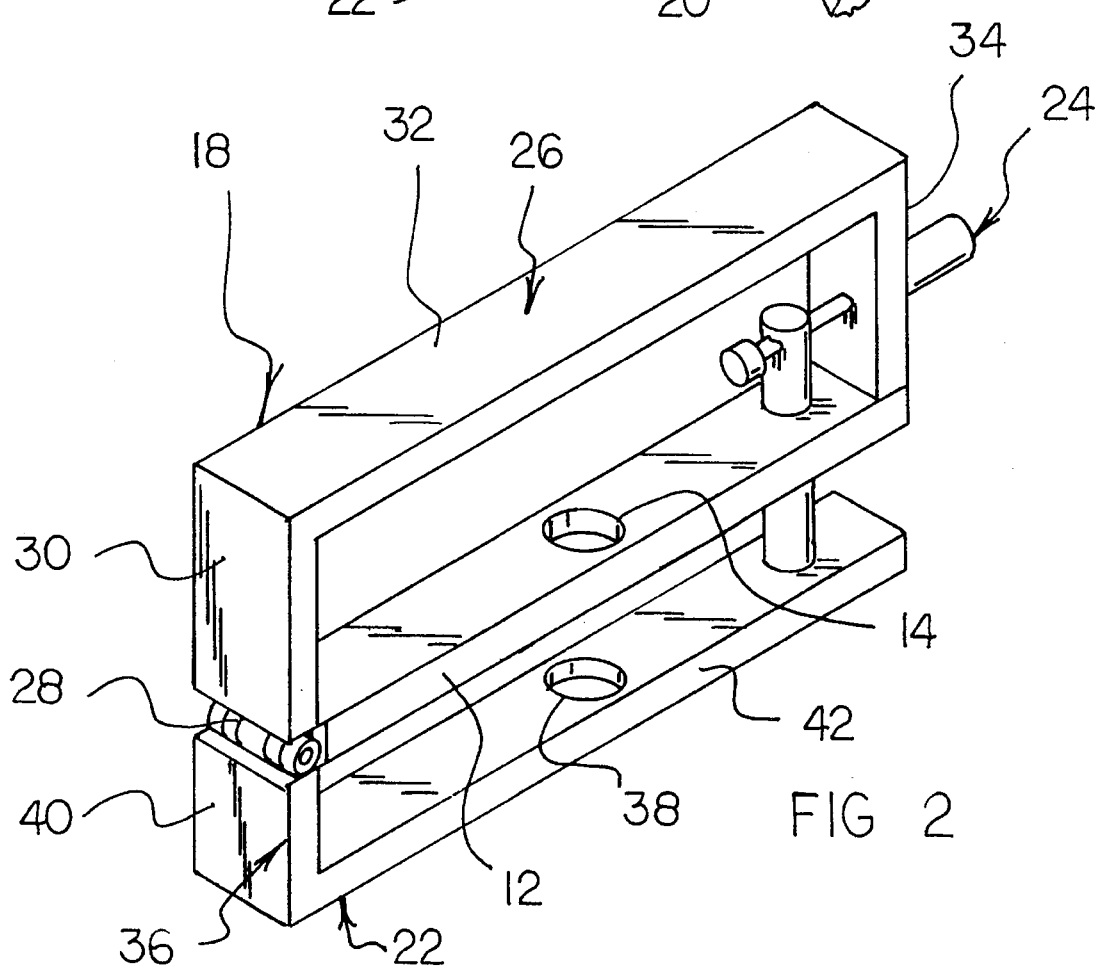
FIG. 2 is an isometric illustration of the invention, per se.

Referring now to FIGS. 2 through 5 wherein the present invention 10 is illustrated in detail, it can be shown that the trailer tongue securing means 18 of the present invention 10 preferably comprises an upper receiver 26 which is pivotally coupled to a lateral edge of the mounting plate 12 by a hinge 28. The upper receiver 26, as shown in FIG. 2, comprises a first upper lateral member 30 coupled to the hinge 28 so as to be pivotally mounted relative to the mounting plate 12. An upper center member 32 projects substantially orthogonally from the first upper lateral member 30 and extends in a spaced and parallel relationship coextensively along the mounting plate 12. A second upper lateral member 34 is fixedly secured to the upper center member 32 and projects substantially orthogonally therefrom into a spaced and parallel orientation relative to the first upper lateral member 30. By this structure, the upper center member 32 of the upper receiver 26 is spaced from the mounting plate 12 a distance sufficient to accommodate the hitch ball 16 and a tongue 20 of a trailer attached thereto so as to preclude unintentional or unauthorized vertical separation of the tongue from the hitch ball 16.

With continuing reference to FIGS. 2 through 5, it can be shown that the ball securing means 22 of the present invention 10 preferably comprises a lower receiver 36 having a receiving aperture 38 directed therethrough and aligned with the mounting aperture 14 of the mounting plate 12 when the lower receiver 36 is positioned in the closed orientation illustrated in FIG. 2 of the drawings. The receiving aperture 38 of the lower receiver 36 is operable to be positioned over an unlabelled shank of the ball hitch 16, as shown in FIG. 3 so as to preclude unauthorized or unintentional removal of a securing nut of the hitch ball 16 during use of the device 10. The lower receiver 36, as shown in FIG. 2, preferably comprises a lower lateral member 40 pivotally secured to the lateral edge of the mounting plate 12 by the hinge 28. A lower center member 42 projects substantially orthogonally from the lower lateral member 40 and into a spaced and parallel orientation relative to the mounting plate 12. The receiving aperture 38 is directed through a center of the lower center member 42 and thus permits projection of a shank of the hitch ball 16 therethrough as shown in FIG. 3 of the drawings. By this structure, a positioning of the lower receiver 36 into the orientation illustrated in FIG. 2 will secure the ball hitch 16 from removal relative to the vehicle hitch. As shown in FIG. 5, the lower receiver 36 may optionally further comprise a receiving cylinder 44 which can be fixedly secured to an interior surface of the lower center member 42 about the receiving aperture 38 by welding or other suitable fastening means. The receiving cylinder 44 operates to receive and enclose the securing nut coupled to the mounting shank of the hitch ball 16 shown in FIG. 3 so as to preclude access to such securing nut by unauthorized individuals.

As best illustrated in FIGS. 3 and 5, it can be shown that the lock means 24 of the present invention 10 preferably comprises a vertical locking pin 46 directed through unlabelled apertures extending through both the lower center member 42 and the mounting plate 12. A horizontal locking pin 48 is orthogonally directed through an end of the vertical locking pin 46 and through the second upper lateral member 34 of the upper receiver 26 and is shaped so as to define an annular groove 50 extending circumferentially thereabout. A conventionally known locking cylinder 52 can be positioned over an end of the horizontal locking pin 48 and actuated through a use of a key 54 so as to engage the annular groove 50 to couple the locking cylinder 52 to the horizontal locking pin 48, thereby precluding removal of the horizontal locking pin from the upper receiver 26 and the vertical locking pin 46. By this structure, the lower receiver 36 and the upper receiver 26 are secured in the closed orientation illustrated in FIG. 2 relative to the mounting plate 12 so as to preclude unauthorized or unintentional removal of the trailer tongue 20 from the hitch ball 16.

In use, the trailer hitch locking assembly 10 according to the present invention can be easily utilized to effect securement of a tongue 20 of a trailer to a hitch ball 16 and to ensure continued securement of the hitch ball 16 relative to a vehicle hitch. The present invention 10, because of the specific structure of the lock means 24, permits an individual to easily gain access to the components of the assembly 10 during decoupling of the trailer tongue 20 from the hitch ball 16. The device 10 can then be stored while coupled to the hitch ball 16 absent the tongue 20 of the trailer during periods of non-use of the device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer hitch locking assembly comprising:
   a mounting plate having a mounting aperture directed therethrough permitting positioning and securement of the mounting plate between a hitch ball and a vehicle hitch;
   a trailer tongue securing means pivotally mounted to the mounting plate and positionable over the hitch ball for capturing a tongue of a trailer between the trailer tongue securing means and the hitch ball;
   a ball securing means pivotally mounted to the mounting plate and positionable over a mounting shank of a hitch ball for precluding unauthorized removal of the hitch ball from the vehicle hitch; and a lock means extending between the ball securing means and the trailer tongue securing means for securing the ball securing means relative to the trailer tongue securing means.

2. The trailer hitch locking assembly of claim 1, wherein the trailer tongue securing means comprises an upper receiver pivotally coupled to a lateral edge of the mounting plate, the upper receiver comprising a first upper lateral member pivotally coupled to the lateral edge of the mounting plate; an upper center member projecting substantially orthogonally from the first upper lateral member and extending in a spaced and parallel relationship coextensively along the mounting plate; a second upper lateral member fixedly secured to the upper center member and projecting substantially orthogonally therefrom into a spaced and parallel orientation relative to the first upper lateral member.

3. The trailer hitch locking assembly of claim 2, wherein the upper center member of the upper receiver is spaced from the mounting plate a distance sufficient to accommodate a hitch ball and a tongue of a trailer attached thereto.

4. The trailer hitch locking assembly of claim 3, wherein the ball securing means comprises a lower receiver having a receiving aperture directed therethrough and aligned with the mounting aperture of the mounting plate, the receiving aperture of the lower receiver being positionable over a shank of the hitch ball.

5. The trailer hitch locking assembly of claim 4, wherein the lower receiver comprises a lower lateral member pivotally secured to the lateral edge of the mounting plate; a lower center member projecting substantially orthogonally from the lower lateral member and into a spaced and parallel orientation relative to the mounting plate, with the receiving aperture being directed through a center of the lower center member.

6. The trailer hitch locking assembly of claim 5, wherein the lower receiver further comprises a receiving cylinder fixedly secured to an interior surface of the lower center member about the receiving aperture.

7. The trailer hitch locking assembly of claim 6, wherein the lock means comprises a vertical locking pin directed through apertures extending through both the lower center member and the mounting plate; a horizontal locking pin orthogonally directed through an end of the vertical locking pin and through an aperture in the second upper lateral member of the upper receiver; and a locking cylinder secured to an end of the horizontal locking pin.

8. The trailer hitch locking assembly of claim 7, wherein the horizontal locking pin is shaped so as to define an annular groove extending circumferentially thereabout, with the locking cylinder being engaged to the end of the horizontal locking pin having the annular groove extending thereabout.

9. A trailer hitch locking assembly comprising:
   a trailer hitch having a hitch ball extending therefrom;
   a trailer having a tongue secured to the hitch ball of the trailer hitch;
   a mounting plate having a mounting aperture directed therethrough, the mounting plate being interposed between the hitch ball and the trailer hitch;
   a trailer tongue securing means pivotally mounted to the mounting plate and positioned over the hitch ball for capturing the tongue of the trailer between the trailer tongue securing means and the hitch ball;
   a ball securing means pivotally mounted to the mounting plate and positioned over a mounting shank of a hitch ball for precluding unauthorized removal of the hitch ball from the vehicle hitch; and a lock means extending between the ball securing means and the trailer tongue securing means for securing the ball securing means relative to the trailer tongue securing means.

10. The trailer hitch locking assembly of claim 9, wherein the trailer tongue securing means comprises an upper receiver pivotally coupled to a lateral edge of the mounting plate, the upper receiver comprising a first upper lateral member pivotally coupled to the lateral edge of the mounting plate; an upper center member projecting substantially orthogonally from the first upper lateral member and extending in a spaced and parallel relationship coextensively along the mounting plate; a second upper lateral member fixedly secured to the upper center member and projecting substantially orthogonally therefrom into a spaced and parallel orientation relative to the first upper lateral member.

11. The trailer hitch locking assembly of claim 10, wherein the upper center member of the upper receiver is spaced from the mounting plate a distance sufficient to accommodate the hitch ball and the tongue of the trailer attached thereto.

12. The trailer hitch locking assembly of claim 11, wherein the ball securing means comprises a lower receiver having a receiving aperture directed therethrough and aligned with the mounting aperture of the mounting plate, the receiving aperture of the lower receiver being positionable over a shank of the hitch ball.

13. The trailer hitch locking assembly of claim 12, wherein the lower receiver comprises a lower lateral member pivotally secured to the lateral edge of the mounting plate; a lower center member projecting substantially orthogonally from the lower lateral member and into a spaced and parallel orientation relative to the mounting plate, with the receiving aperture being directed through a center of the lower center member.

14. The trailer hitch locking assembly of claim 13, wherein the lower receiver further comprises a receiving cylinder fixedly secured to an interior surface of the lower center member about the receiving aperture.

15. The trailer hitch locking assembly of claim 14, wherein the lock means comprises a vertical locking pin directed through apertures extending through both the lower center member and the mounting plate; a horizontal locking pin orthogonally directed through an end of the vertical locking pin and through an aperture in the second upper lateral member of the upper receiver; and a locking cylinder secured to an end of the horizontal locking pin.

16. The trailer hitch locking assembly of claim 15, wherein the horizontal locking pin is shaped so as to define an annular groove extending circumferentially thereabout, with the locking cylinder being engaged to the end of the horizontal locking pin having the annular groove extending thereabout.

* * * * *